US010986358B2

(12) United States Patent
Lee

(10) Patent No.: US 10,986,358 B2
(45) Date of Patent: Apr. 20, 2021

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/314,774

(22) PCT Filed: Jun. 30, 2017

(86) PCT No.: PCT/KR2017/006976
§ 371 (c)(1),
(2) Date: Jan. 2, 2019

(87) PCT Pub. No.: WO2018/008905
PCT Pub. Date: Jan. 11, 2018

(65) Prior Publication Data
US 2019/0313113 A1    Oct. 10, 2019

(30) Foreign Application Priority Data

Jul. 5, 2016    (KR) .................. 10-2016-0085014

(51) Int. Cl.
*H04B 1/66*    (2006.01)
*H04N 7/12*    (2006.01)
(Continued)

(52) U.S. Cl.
CPC ........... *H04N 19/51* (2014.11); *H04N 19/105* (2014.11); *H04N 19/107* (2014.11);
(Continued)

(58) Field of Classification Search
CPC ............................. H04N 19/46; H04N 19/149
See application file for complete search history.

(56) References Cited

U.S. PATENT DOCUMENTS 9,491,460 B2 *  11/2016  Seregin ............... H04N 19/109
2008/0253456 A1  10/2008  Yin et al.
(Continued)

FOREIGN PATENT DOCUMENTS

CN          104813668 A      7/2015
CN          104969556 A     10/2015
(Continued)

OTHER PUBLICATIONS

Chen et al. "Generalized bi-prediction for inter coding." Document JVET-00047. June (Year: 2016).*
(Continued)

*Primary Examiner* — Fabio S Lima
(74) *Attorney, Agent, or Firm* — IP Legal Services, LLC

(57) ABSTRACT

A method for decoding a video according to the present invention may comprise: decoding information indicating whether illumination compensation is performed for a current block, determining an illumination compensation parameter of the current block when the information indicates that the illumination compensation is performed for the current block, obtaining a prediction block by performing inter prediction for the current block, and performing the illumination compensation on the current block using the illumination compensation parameter.

5 Claims, 11 Drawing Sheets

(51) Int. Cl.
  *H04N 11/02* (2006.01)
  *H04N 11/04* (2006.01)
  *H04N 19/51* (2014.01)
  *H04N 19/176* (2014.01)
  *H04N 19/91* (2014.01)
  *H04N 19/119* (2014.01)
  *H04N 19/70* (2014.01)
  *H04N 19/107* (2014.01)
  *H04N 19/50* (2014.01)
  *H04N 19/105* (2014.01)

(52) U.S. Cl.
  CPC ......... *H04N 19/119* (2014.11); *H04N 19/176* (2014.11); *H04N 19/50* (2014.11); *H04N 19/70* (2014.11); *H04N 19/91* (2014.11)

(56) References Cited

U.S. PATENT DOCUMENTS

| | | | |
|---|---|---|---|
| 2010/0195723 A1 | 8/2010 | Ikai et al. | |
| 2010/0215095 A1* | 8/2010 | Hayase | H04N 19/577 375/240.02 |
| 2011/0007802 A1 | 1/2011 | Karczewicz et al. | |
| 2014/0056352 A1* | 2/2014 | Park | H04N 19/117 375/240.12 |
| 2014/0056357 A1* | 2/2014 | Tanizawa | H04N 19/91 375/240.16 |
| 2014/0112392 A1* | 4/2014 | Lim | H04N 19/117 375/240.16 |
| 2014/0139627 A1 | 5/2014 | Chen et al. | |
| 2014/0168362 A1 | 6/2014 | Hannuksela et al. | |
| 2014/0185680 A1* | 7/2014 | Li | H04N 19/154 375/240.16 |
| 2014/0328403 A1* | 11/2014 | Lim | H04N 19/59 375/240.16 |
| 2015/0023422 A1 | 1/2015 | Zhang et al. | |
| 2015/0229965 A1 | 8/2015 | Park et al. | |
| 2015/0326881 A1* | 11/2015 | Ikai | H04N 19/82 375/240.12 |
| 2015/0350642 A1 | 12/2015 | Park et al. | |
| 2015/0358616 A1 | 12/2015 | Heo et al. | |
| 2015/0381986 A1 | 12/2015 | Chen et al. | |
| 2016/0073110 A1 | 3/2016 | Kim et al. | |
| 2016/0165209 A1 | 6/2016 | Huang et al. | |
| 2016/0366416 A1* | 12/2016 | Liu | G06T 7/20 |
| 2018/0184117 A1* | 6/2018 | Chen | H04N 19/523 |
| 2018/0288410 A1* | 10/2018 | Park | H04N 19/105 |
| 2019/0037213 A1* | 1/2019 | Hermansson | H04N 19/107 |
| 2019/0394459 A1* | 12/2019 | Ye | H04N 19/105 |

FOREIGN PATENT DOCUMENTS

| | | |
|---|---|---|
| CN | 105103552 A | 11/2015 |
| WO | 2012/148138 A2 | 11/2012 |
| WO | 2013/005941 A2 | 1/2013 |
| WO | 2013/109039 A1 | 7/2013 |

OTHER PUBLICATIONS

Vivienne Sze et al., "High Efficiency Video Coding (HEVC)", Algorithms and Architectures, 2014, Springer International Publishing, Switzerland.

Jill M. Boyce et al., "Weighted Prediction in the H.264/MPEG AVC Video Coding Standard", 2004 IEEE, pp. 789-792.

Hongbin Liu et al., "3D-CE1.h related: Illumination Compensation for Inter-View Predictio", Document: JCT2-A0086, Joint Collaborative Team on 3D Video Coding Extension Development of ITU-T SG 16 WO 3 and ISO/IEC JTC 1/SC 29/WG 11, 1st Meeting: Stockholm, SE, Jul. 16-20, 2012.

Joon-Young Park et al., "Intra prediction with subpel samples", Document: VCEG-AG09, ITU-Telecommunications Standardization Sector Study Group 16 Question 6, Video Coding Experts Group (VCEG), 33rd Meeting: Shenzhen, China, Oct. 20, 2007, pp. 1-8.

European Patent Office, European Search Report of corresponding EP Patent Application No. 17824461.2, dated Nov. 5, 2019.

State Intellectual Property Office of People'S Republic of China, Office Action of corresponding CN Patent Application No. 201780041654.0, dated Nov. 26, 2020.

* cited by examiner

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2017/006976 (filed on Jun. 30, 2017) under 35 U.S.C. § 371, which claims priority to Korean Patent Application No. 10-2016-0085014 (filed on Jul. 5, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for efficiently performing inter prediction for an encoding/decoding target block in encoding/decoding a video signal.

An object of the present invention is intended to provide a method and an apparatus for compensating a prediction sample in consideration of a change of luminance between pictures.

An object of the present invention is intended to provide a method and an apparatus for efficiently encoding/decoding an illumination compensation parameter in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may decode information indicating whether illumination compensation is performed for a current block, determine an illumination compensation parameter of the current block when the information indicates that the illumination compensation is performed for the current block, obtain a prediction block by performing inter prediction for the current block, and perform the illumination compensation on the current block using the illumination compensation parameter.

A method and an apparatus for encoding a video signal according to the present invention may obtain a prediction block by performing inter prediction for a current block, determining an illumination compensation parameter for the current block, performing illumination compensation for the prediction block using the illumination compensation parameter, and encode information indicating whether the illumination compensation is performed for the current block.

In the method and the apparatus for encoding/decoding a video signal according to the present invention, the illumination compensation parameter is derived based on a first template area adjacent to the current block and a second template area adjacent to a reference block included in a reference picture of the current block.

In the method and the apparatus for encoding/decoding a video signal according to the present invention, if an unavailable sample is included in the second template area, the unavailable sample may be replaced with an available sample.

In the method and the apparatus for encoding/decoding a video signal according to the present invention, the available sample may be included in the second template area or the reference block.

In the method and the apparatus for encoding/decoding a video signal according to the present invention, if the unavailable sample is included in the second template area, the unavailable sample may be replaced with an interpolated value of a plurality of available samples.

In the method and the apparatus for encoding/decoding a video signal according to the present invention, obtaining the prediction block may comprise obtaining a first prediction block based on a first reference picture of the current block, and obtaining a second prediction block based on a second reference picture of the current block.

In the method and the apparatus for encoding/decoding a video signal according to the present invention, the illumination compensation may be performed on at least one of the first prediction block or the second prediction block.

In the method and the apparatus for encoding/decoding a video signal according to the present invention, the prediction block may be obtained by weighted sum of the first prediction block and the second prediction block. At this time, weights applied to the first prediction block and the second prediction block may be determined by a weighted prediction parameter of the current block.

In the method and the apparatus for encoding/decoding a video signal according to the present invention, the weighted prediction parameter may be determined based on the illumination compensation parameter.

In the method and the apparatus for encoding/decoding a video signal according to the present invention, the prediction block may be obtained by weighted sum of the first prediction block and the second prediction block. At this time, a weight applied to one of the first reference block and the second reference block may be determined based on the illumination compensation parameter and a weight applied to the other of the first reference block and the second reference block may be determined based on a weighted prediction parameter of the current block.

The features briefly summarized above for the present invention are only illustrative aspects of the detailed description of the invention that follows, but do not limit the scope of the invention.

Advantageous Effects

According to the present invention, an efficient inter prediction may be performed for an encoding/decoding target block.

According to present invention, a prediction sample may be compensated in consideration of a change of luminance between pictures.

According to present invention, an illumination compensation parameter can be efficiently encoded/decoded.

The effects obtainable by the present invention are not limited to the above-mentioned effects, and other effects not mentioned can be clearly understood by those skilled in the art from the description below.

MODE FOR INVENTION

Figure 1:
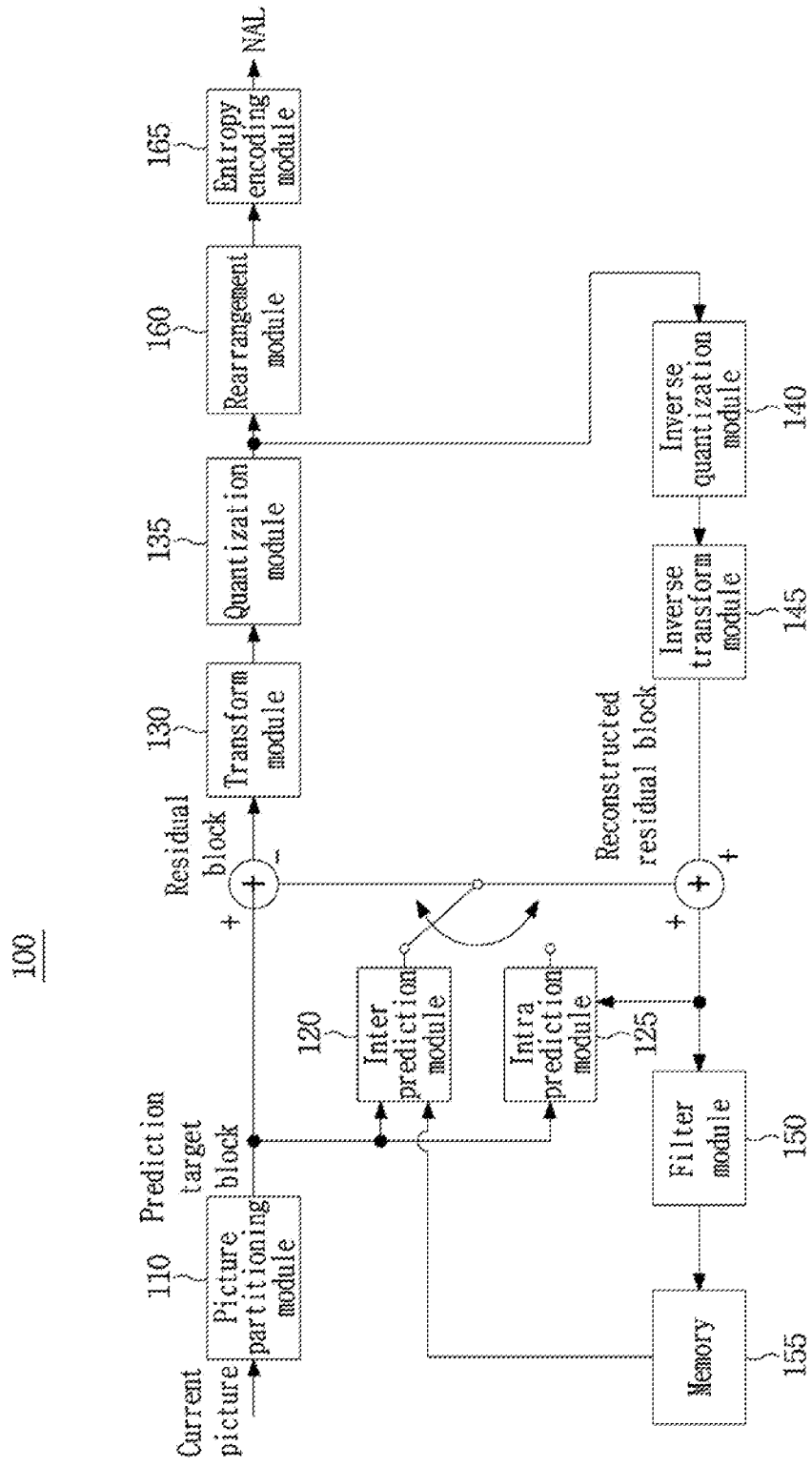
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
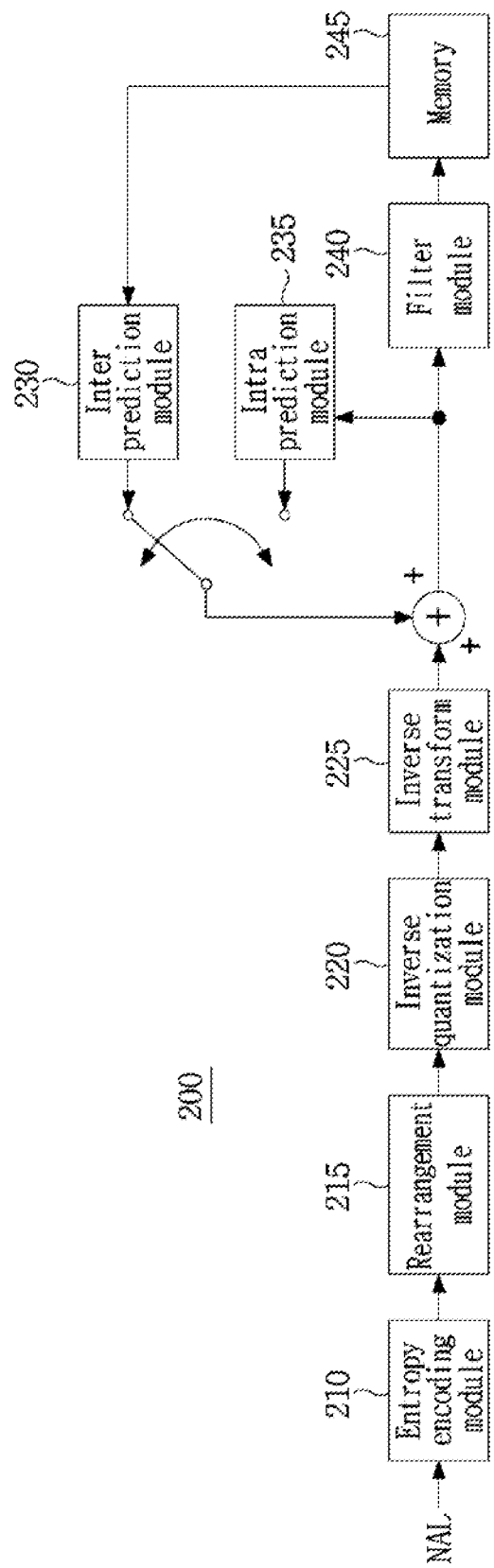
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
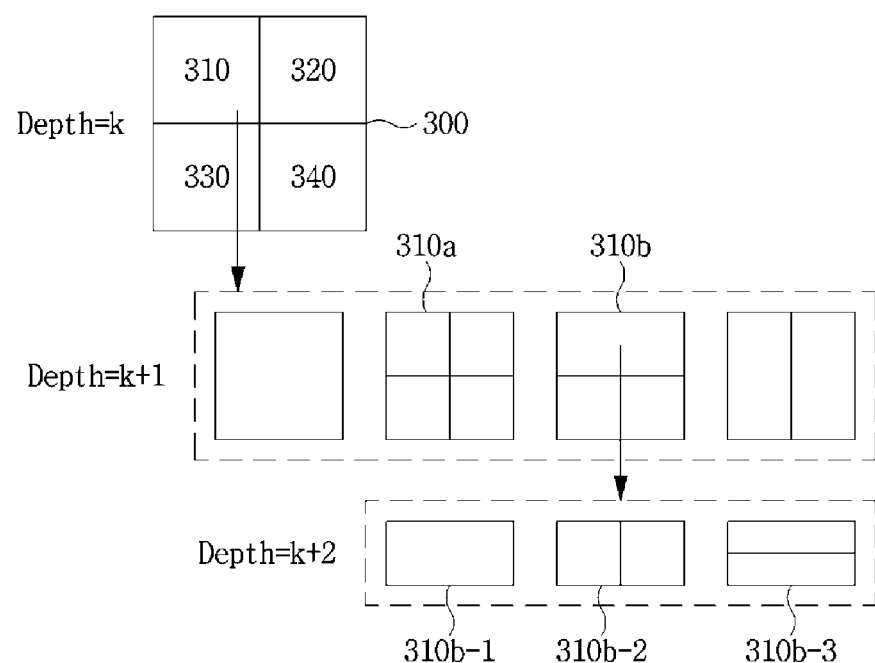
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of a upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5:
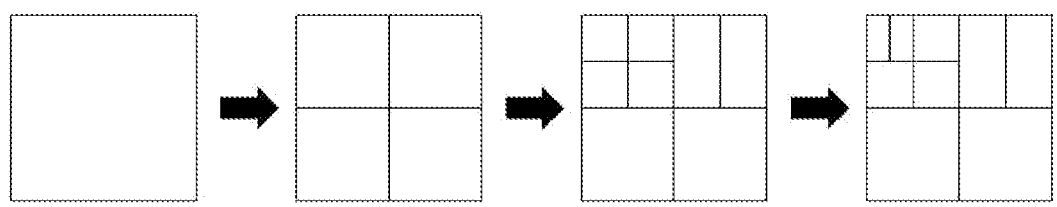
FIG. 5 is a diagram illustrating an example in which only a binary tree-based partition of a pre-determined type is allowed according to an embodiment of the present invention.
Figure 5:
Figure 5:
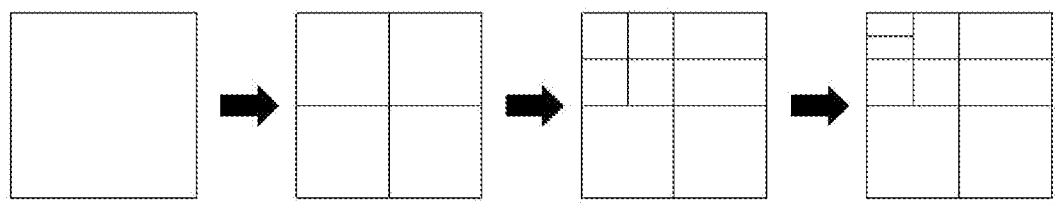
Figure 5:

FIG. 5 is a diagram illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
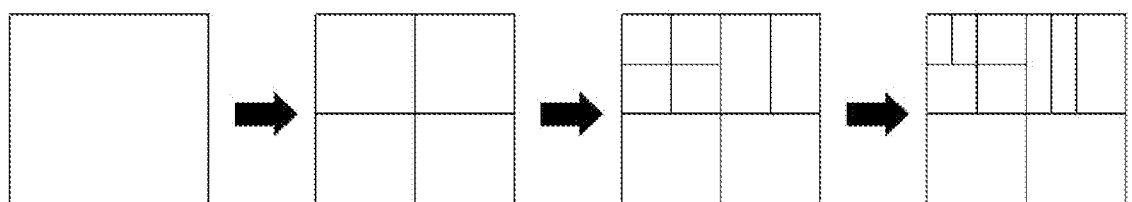
FIG. 6 is a diagram for explaining an example in which information related to the allowable number of binary tree partitioning is encoded/decoded, according to an embodiment to which the present invention is applied.
Figure 6:

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
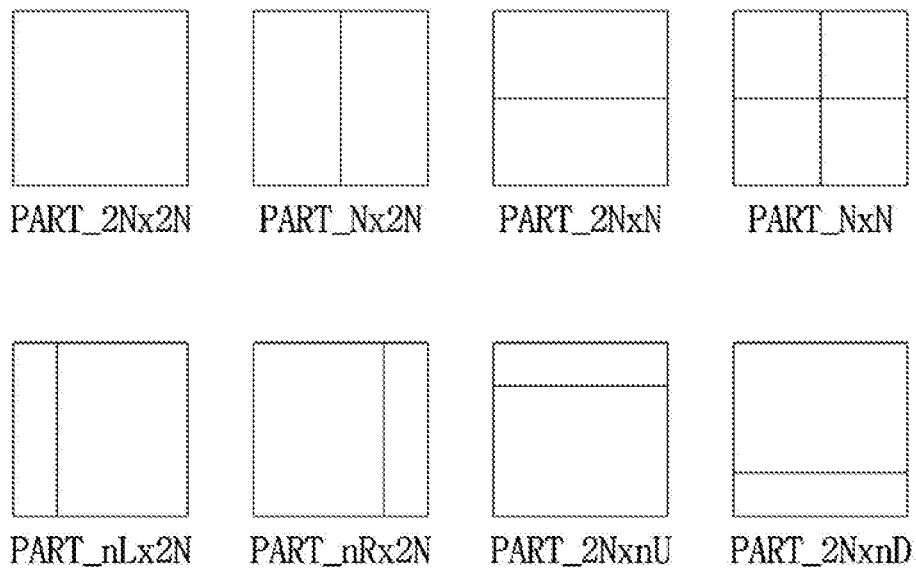
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
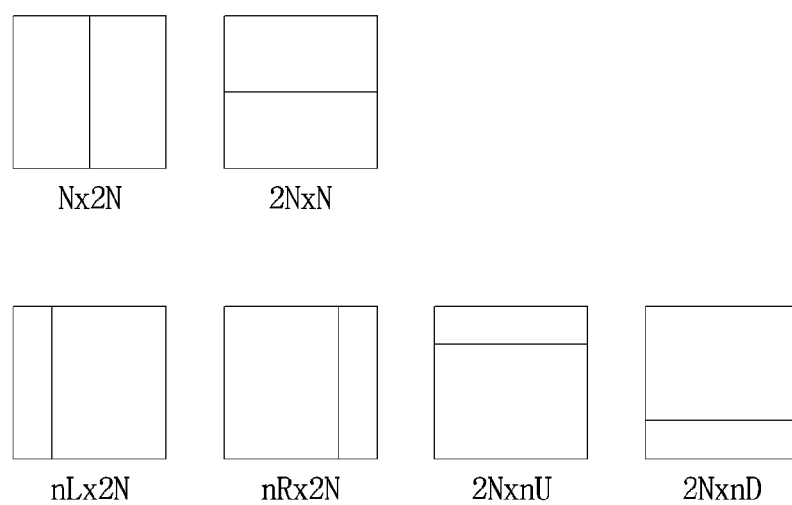
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be predefined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
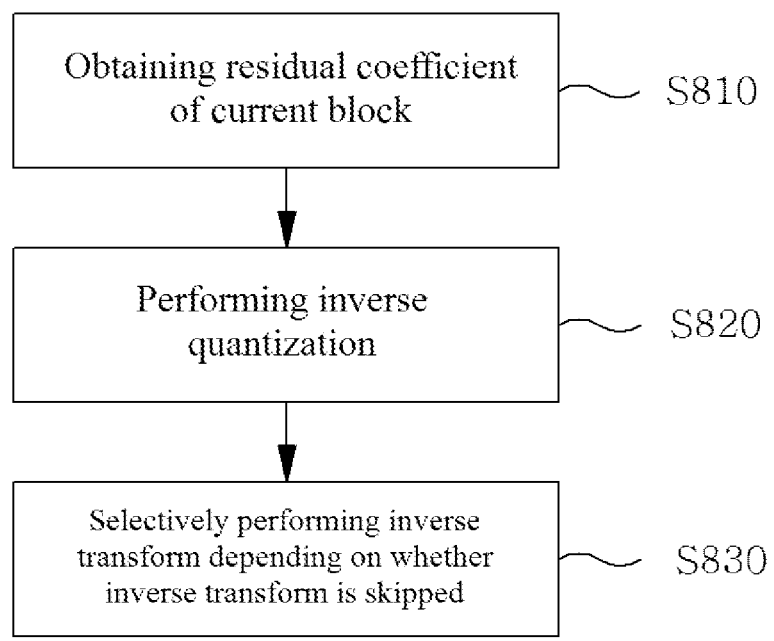
FIG. 8 is a flowchart illustrating processes of obtaining a residual sample according to an embodiment to which the present invention is applied.

FIG. 8 is a flowchart illustrating processes of obtaining a residual sample according to an embodiment to which the present invention is applied.

First, a residual coefficient of a current block may be obtained S810. A decoder may obtain a residual coefficient through a coefficient scanning method. For example, the decoder may perform a coefficient scan using a jig-zag scan, a vertical scan, or a horizontal scan, and may obtain residual coefficients in a form of a two-dimensional block.

An inverse quantization may be performed on the residual coefficient of the current block S820.

An inverse transform is selectively performed according to whether to skip the inverse transform on the dequantized residual coefficient of the current block S830. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Figure 9:
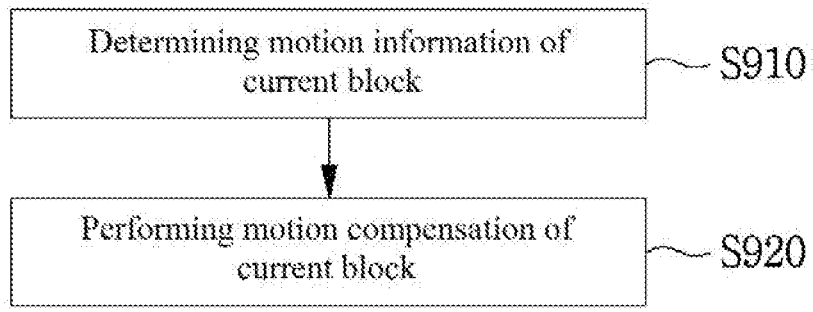
FIG. 9 is a flowchart illustrating an inter prediction method according to an embodiment to which the present invention is applied.

FIG. 9 is a flowchart illustrating an inter prediction method according to an embodiment to which the present invention is applied.

Referring to FIG. 9, motion information of a current block is determined S910. The motion information of the current block may include at least one of a motion vector relating to the current block, a reference picture index of the current block, or an inter prediction direction of the current block.

The motion information of the current block may be obtained based on at least one of information signaled through a bitstream or motion information of a neighboring block adjacent to the current block.

Figure 10:
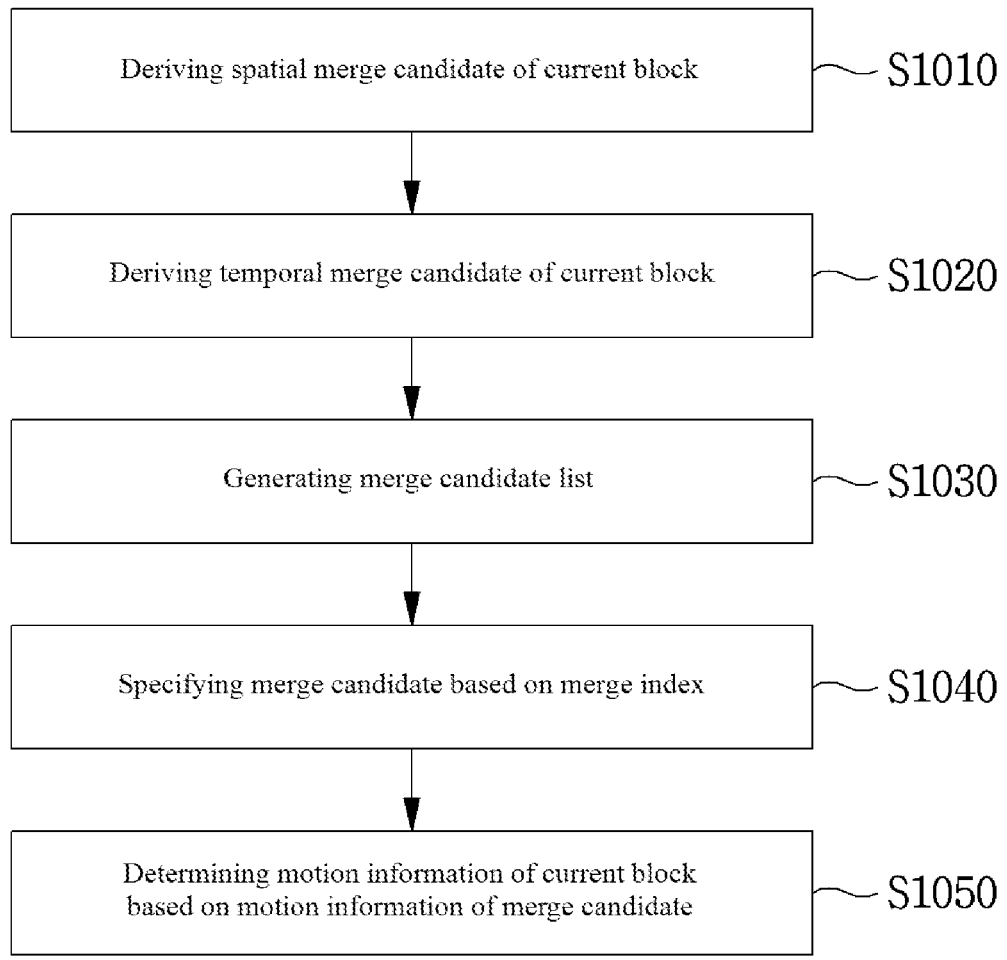
FIG. 10 is a diagram illustrating processes of deriving motion information of a current block when a merge mode is applied to the current block.

FIG. 10 is a diagram illustrating processes of deriving motion information of a current block when a merge mode is applied to the current block.

If the merge mode is applied to the current block, a spatial merge candidate may be derived from a spatial neighboring block of the current block S1010. The spatial neighboring block may comprise at least one of blocks adjacent to a left, a top or a corner (e.g., at least one of a top-left corner, a right-top corner or a left-bottom corner) of the current block.

Motion information of the spatial merge candidate may be set to be the same as motion information of the spatial neighboring block.

A temporal merge candidate may be derived from a temporal neighboring block of the current block S1020. The temporal neighboring block may mean a block included in a collocated picture. The collocated picture has a picture order count (POC) different from a current picture including the current block. The collocated picture may be determined as a picture having a predefined index in a reference picture list or may be determined by an index signaled from a bitstream. The temporal neighboring block may be determined to be a block comprising coordinates in a collocated block that has the same position as the current block in the collocated picture, or a block adjacent to the collocated block. For example, at least one of a block including center coordinates of the collocated block or a block adjacent to the bottom left boundary of the collocated block may be determined as the temporal neighboring block.

Motion information of the temporal merge candidate may be determined based on motion information of the temporal neighboring block. For example, a motion vector of the temporal merge candidate may be determined based on a motion vector of the temporal neighboring block. In addition, an inter prediction direction of the temporal merge candidate may be set to be the same as an inter prediction direction of the temporal neighboring block. However, a reference picture index of the temporal merge candidate may have a fixed value. For example, the reference picture index of the temporal merge candidate may be set to '0'.

Thereafter, a merge candidate list including the spatial merge candidate and the temporal merge candidate may be generated 51030. If the number of merge candidates included in the merge candidate list is smaller than a maximum merge candidate number, a combined merge candidate combining two or more merge candidates may be included in the merge candidate list.

When the merge candidate list is generated, at least one of merge candidates included in the merge candidate list may be specified based on a merge candidate index S1040.

Motion information of the current block may be set to be the same as motion information of the merge candidate specified by the merge candidate index S1050. For example, when the spatial merge candidate is selected by the merge candidate index, the motion information of the current block may be set to be the same as the motion information of the spatial neighboring block. Alternatively, when the temporal merge candidate is selected by the merge candidate index, the motion information of the current block may be set to be the same as the motion information of the temporal neighboring block.

Figure 11:
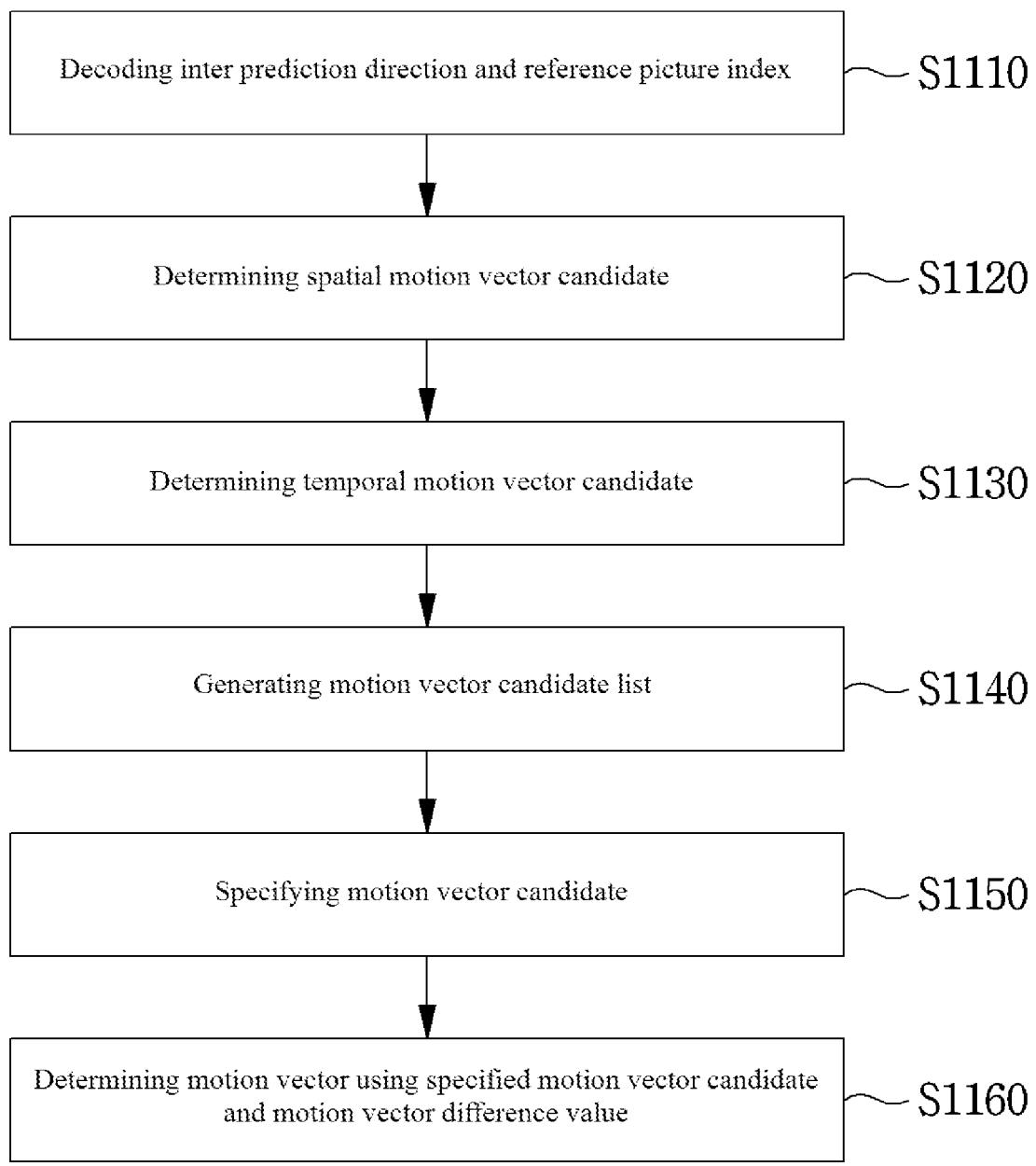
FIG. 11 is a diagram illustrating processes of deriving motion information of a current block when an AMVP mode is applied to the current block.

FIG. 11 is a diagram illustrating processes of deriving motion information of a current block when an AMVP mode is applied to the current block.

When the AMVP mode is applied to the current block, at least one of an inter prediction direction of the current block or a reference picture index may be decoded from a bitstream S1110. That is, when the AMVP mode is applied, at least one of the inter prediction direction or the reference picture index of the current block may be determined based on information encoded through the bitstream.

A spatial motion vector candidate may be determined based on a motion vector of a spatial neighboring block of the current block S1120. The spatial motion vector candidate may include at least one of a first spatial motion vector candidate derived from a top neighboring block of the current block and a second spatial motion vector candidate derived from a left neighboring block of the current block. Here, the top neighboring block may include at least one of blocks adjacent to a top or a top right corner of the current block, and the left neighboring block of the current block may include at least one of blocks adjacent to a left or a bottom left corner of the current block. A block adjacent to a top left corner of the current block may be treated as the top neighboring block, or as the left neighboring block.

When reference pictures between the current block and the spatial neighboring block are different from each other, it is also possible to obtain the spatial motion vector by scaling the motion vector of the spatial neighboring block.

A temporal motion vector candidate may be determined based on a motion vector of a temporal neighboring block of the current block S1130. When reference pictures between the current block and the temporal neighboring block are different from each other, it is also possible to obtain the temporal motion vector by scaling the motion vector of the temporal neighboring block.

A motion vector candidate list including the spatial motion vector candidate and the temporal motion vector candidate may be generated S1140.

When the motion vector candidate list is generated, at least one of motion vector candidates included in the motion vector candidate list may be specified based on information specifying at least one from the motion vector candidate list S1150.

The motion vector candidate specified by the information may be set as a motion vector prediction value of the current block, and a motion vector difference value may be added to the motion vector prediction value to obtain a motion vector of the current block S1160. At this time, the motion vector difference value may be parsed through the bitstream.

When motion information of the current block is obtained, motion compensation for the current block may be performed based on the obtained motion information S920. More specifically, the motion compensation for the current block may be performed based on the inter prediction direction, the reference picture index, and the motion vector of the current block.

The inter prediction direction may indicate N directions. Here, N is a natural number, and may be 1, 2, or 3 or more. If the inter prediction direction indicates N directions, it means that inter prediction of the current block is performed based on N reference pictures or N reference blocks. For example, when the inter prediction direction of the current block indicates a uni-direction, the inter prediction of the current block may be performed based on one reference picture. On the other hands, when the inter prediction of the current block indicates a bi-direction, the inter prediction of the current block may be performed using two reference pictures or two reference blocks.

It is also possible to determine whether a multi-directional prediction is allowed for the current block based on at least one of a size or a shape of the current block. For example, when a coding unit has a square shape, the multi-directional prediction is allowed for encoding/decoding thereof. On the other hand, when the coding unit has a non-square shape, only uni-directional prediction is allowed for encoding/decoding thereof. On the contrary to the cases above, it is also possible to set that the multi-directional prediction is allowed for encoding/decoding the coding unit when it has the non-square shape, and only the uni-directional prediction is allowed for encoding/decoding the coding unit when it has the square shape. Alternatively, it is also possible to set that the multi-directional prediction is not allowed for encoding/decoding a prediction unit, when the prediction unit has the non-square shape of 4×8 or 8×4 or the like.

The reference picture index may specify a reference picture to be used for inter prediction of the current block. Specifically, the reference picture index may specify any one of reference pictures included in the reference picture list. For example, when the inter prediction direction of the current block is bi-directional, the reference picture (reference picture L0) included in the reference picture list L0 is specified by a reference picture index L0, and the reference picture (reference picture L1) included in the reference picture list L1 is specified by a reference picture index L1.

Alternatively, one reference picture may be included in two or more reference picture lists. Accordingly, even if the reference picture index of the reference picture included in the reference picture list L0 and the reference picture index of the reference picture included in the reference picture list L1 are different, temporal orders (picture order count, POC) of both reference pictures may be the same.

The motion vector may be used to specify a position of a reference block, in the reference picture, corresponding to a prediction block of the current block. Inter prediction of the current block may be performed based on the reference block, specified by the motion vector, in the reference picture. For example, an integer pixel included in the reference block or a non-integer pixel generated by interpolating integer pixels may be generated as a prediction sample of the current block. It is also possible that reference blocks specified by different motion vectors may be included in the same reference picture. For example, when the reference picture selected from the reference picture list L0 and the reference picture selected from the reference picture list L1 are the same, the reference block specified by a motion vector L0 and the reference block specified by a motion vector L1 may be included in the same reference picture.

As described above, when the inter prediction direction of the current block indicates two or more directions, the motion compensation for the current block may be performed based on two or more reference pictures or two or more reference blocks.

For example, when the current block is encoded with bi-directional prediction, the prediction block of the current block may be obtained based on two reference blocks obtained from two reference pictures. Also, when the current block is encoded with bi-directional prediction, a residual block indicating the difference between an original block and the prediction block obtained based on the two reference blocks may be encoded/decoded.

When two or more reference pictures are used, the motion compensation for the current block may be performed by applying the same or different weights to the respective reference pictures. Hereinafter, a method of performing weighted prediction on the current block will be described in detail in the following embodiments when the inter prediction direction indicates two or more directions. For convenience of explanation, it is assumed that the inter prediction direction of the current block is bi-directional. However, even when the inter prediction direction of the current block indicates three or more, the following embodiment can be applied with application. In addition, the motion compensation for the current block using two prediction images will be referred to as a bi-directional prediction method or a bi-directional prediction encoding/decoding method.

When the bi-directional prediction is applied to the current block, reference pictures used for the bi-directional prediction of the current block may include a picture whose temporal order (Picture Order Count, POC) is previous to the current picture, a picture whose temporal order is subsequent to the current picture, or the current picture. For example, one of two reference pictures may be a picture whose temporal order is previous to the current picture, and the other picture may be a picture whose temporal order is subsequent to the current picture. Alternatively, one of the two reference pictures may be the current picture, and the other picture may be a picture whose temporal order is previous to the current block or whose temporal order is subsequent to the current picture. Alternatively, both of the two reference pictures may have temporal orders previous to the current picture, or may have temporal orders subsequent to the current picture. Alternatively, both of the two reference pictures may be the current picture.

Two prediction blocks may be generated from each of two reference picture lists. For example, a prediction block based on the reference picture L0 may be generated based on the motion vector L0, and a prediction block based on the reference picture L1 may be generated based on the motion vector L1. It is also possible that the prediction block generated by the motion vector L0 and the prediction block generated by the motion vector L1 may be generated based on the same reference picture.

A prediction block of the current block may be obtained based on an average value of the prediction blocks generated based on both reference pictures. For example, Equation 1 shows an example of obtaining the prediction block of the current block based on the average value of a plurality of the prediction blocks.

$$P(x)=\frac{1}{2}*P_0(x)+\frac{1}{2}*P_1(x) \qquad \text{[Equation 1]}$$

In Equation 1, P(x) denotes a final prediction sample of the current block or a bi-directionally predicted prediction sample, and $P_N(x)$ denotes a sample value of a prediction block LN generated based on a reference picture LN. For example, $P_0(x)$ may mean a prediction sample of the prediction block generated based on the reference picture L0, and $P_1(x)$ may mean a prediction sample of the prediction block generated based on the reference picture L1. That is, according to Equation 1, the final prediction block of the current block may be obtained based on the weighted sum of the plurality of the prediction blocks generated based on the plurality of the reference pictures. At this time, a weight of a fixed value predefined in the encoder/decoder may be assigned to each prediction block.

According to an embodiment of the present invention, the final prediction block of the current block is obtained based on the weighted sum of a plurality of the prediction blocks, and the weight assigned to each prediction block may be variably/adaptively determined. For example, when both reference pictures or both prediction blocks have different brightness, it is more effective to perform bi-directional prediction for the current block by applying different weights to each of the prediction blocks than to perform the bi-directional prediction for the current block by averaging the prediction blocks. Hereinafter, for convenience of explanation, the bi-directional prediction method when the weight assigned to each of the prediction blocks is variably/adaptively determined will be referred to as 'bi-directional weighted prediction'.

It is also possible to determine whether or not the bi-directional weighted prediction is allowed for the current block based on at least one of a size or a shape of the current block. For example, if the coding unit has a square shape, it is allowed to encode/decode thereof using the bi-directional weighted prediction, whereas if the coding unit has a non-square shape, it is not allowed to encode/decode thereof using the bi-directional weighted prediction. On the contrary to the above cases, it is also possible to set that it is allowed to encode/decode the coding block using the bi-directional weighted prediction when it has the non-square shape, and it is not allowed to encode/decode the coding block using the bi-directional weighted prediction when it has the square shape. Alternatively, it is also possible to set that the bi-directional weighted prediction is not allowed for encoding/decoding the prediction unit when the prediction unit is a non-square partition having a size of 4×8 or 8×4 or the like.

Figure 12:
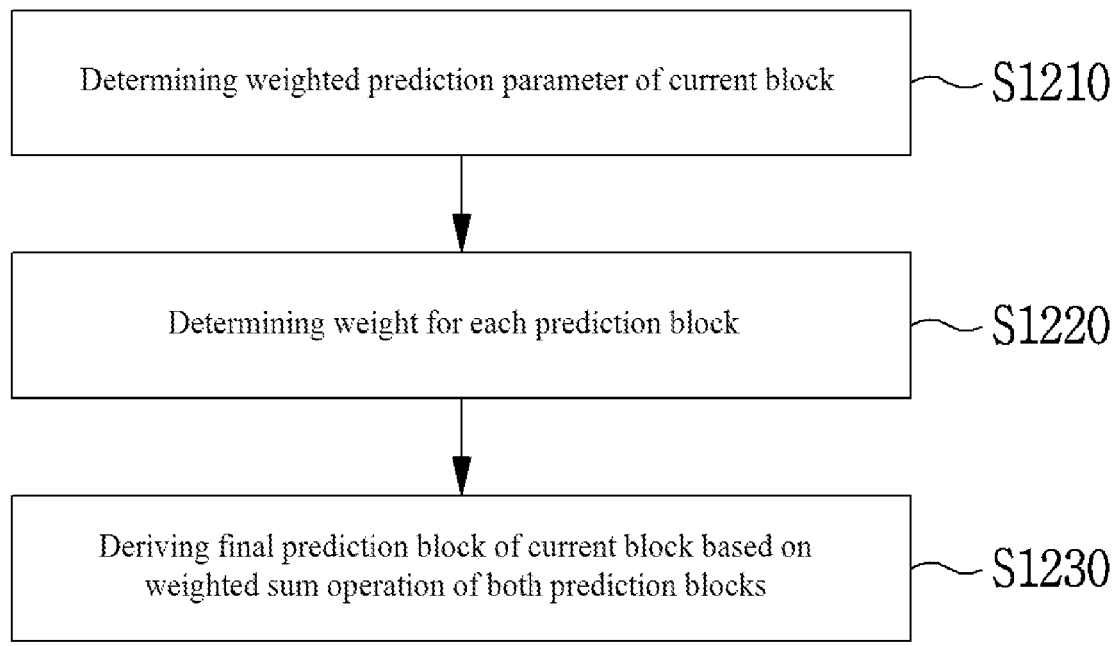
FIG. 12 is a flowchart of a bi-directional weighted prediction method, in accordance with an embodiment of the present invention.

FIG. 12 is a flowchart of a bi-directional weighted prediction method, in accordance with an embodiment of the present invention.

Figure 13:
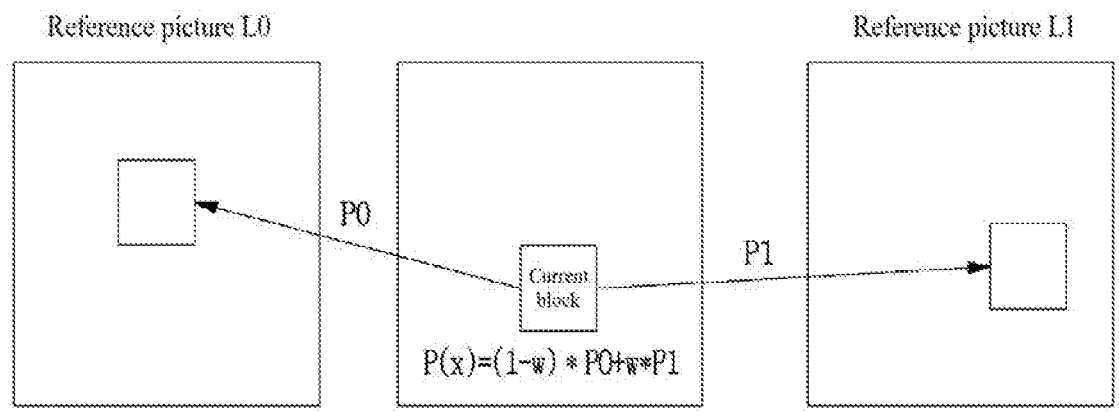
FIG. 13 is a diagram for explaining a principle of bi-directional weighted prediction.

In order to perform the bi-directional weighted prediction, a weighted prediction parameter for the current block may be determined S1210. The weighted prediction parameter may be used to determine a weight to be applied to both reference pictures. For example, as depicted in FIG. 13, a weight of 1-w may be applied to a prediction block generated based on a reference picture L0, and a weight of w may be applied to a prediction block generated based on a reference picture L1. Based on the weighted prediction parameters, the weight to be applied to each prediction block is determined S1220, and a weighted sum operation of a plurality of the prediction blocks is performed based on the determined weight to generate a final predicted block of the current block S1230. For example, the final prediction block of the current block may be generated based on the following Equation 2.

$$P(x)=(1-w)*P_0(x)+w*P_1(x) \qquad \text{[Equation 2]}$$

In Equation 2, w represents the weighted prediction parameter.

As shown in Equation 2, the final prediction block P(x) of the current block may be obtained by assigning the weight of 1-w to the prediction block $P_0$ and assigning the weight of w to the prediction block $P_1$. It is also possible to assign the weight of w to the prediction block $P_0$ and to assign the weight of 1-w to the prediction block $P_1$, as opposed to that shown in Equation 2.

The weighted prediction parameter may be determined based on a difference of brightness between the reference pictures, or may be determined based on a distance between the current picture and the reference pictures (i.e., the POC difference). Alternatively, it is also possible to determine the weighted prediction parameter based on the size or the shape of the current block.

The weighted prediction parameter may be determined in units of a block (for example, a coding tree unit, a coding unit, a prediction unit, or a transform unit), or may be determined in units of a slice or a picture.

At this time, the weighted prediction parameter may be determined based on predefined candidate weighted prediction parameters. As an example, the weighted prediction parameter may be determined to be one of predefined values like −¼, ¼, ⅜, ½, ⅝, ¾ or 5/4.

Alternatively, after determining a weighted prediction parameter set for the current block, it is also possible to determine the weighted prediction parameter from at least one of candidate weighted prediction parameters included in the determined weighted prediction parameter set. The weighted prediction parameter set may be determined in units of a block (for example, a coding tree unit, a coding unit, a prediction unit, or a transform unit), or may be determined in units of a slice or a picture.

For example, if one of weighted prediction parameter sets w0 and w1 is selected, at least one of candidate weighted prediction parameters included in the selected weighted prediction parameter set may be determined as the weighted prediction parameter for the current block. For example, it is assumed as 'w0={−¼, ¼, ⅜, ½, ⅝, ¾, 5/4}' and 'w1={−⅜, 4, ⅜, ½, ⅝, ¾}'. When the weighted prediction parameter set w0 is selected, the weighted prediction parameter w of the current block may be determined as one of the candidate weighted prediction parameters −¼, ¼, ⅜, ½, ⅝, ¾ and 5/4 included in the w0.

The weighted prediction parameter set available for the current block may be determined according to a temporal order or a temporal direction of the reference picture used for the bi-directional prediction. The temporal order may indicate an encoding/decoding order between pictures, or may indicate an output order (e.g., POC) of the pictures. In addition, the temporal direction may indicate whether the temporal order of the reference picture is previous to or subsequent to the current picture.

As an example, depending on whether two reference pictures used for the bi-directional prediction have the same temporal order, the weighted prediction parameter set available to the current picture may be determined. For example, depending on whether the reference picture L0 and the reference picture L1 are the same picture (that is, the temporal order of the pictures being same) or whether the reference picture L0 and the reference picture L1 are different from each other (that is, temporal orders of the pictures being different), the weighted prediction parameter set available for the current block may be variably determined.

Different weighted prediction parameter sets may mean that at least one of an absolute value, a sign, or a number of weighted prediction parameters included in each set of weighted prediction parameters are different. For example, when the temporal directions of the reference picture L0 and the reference picture L1 are the same, the weighted prediction parameter set w0={−¼, ¼, ⅜, ½, ⅝, ¾} may be used, and when the temporal directions of the reference picture L0 and the reference picture L1 are different, the weighted prediction parameters set w1={−⅜, −¼, ¼, ⅜, ½, /8, ¾} may be used.

As an example, depending on whether or not the temporal directions of the two reference pictures used in the bi-directional prediction are the same, the weighted prediction parameter set available for the current picture may be determined. For example, the weighted prediction parameter set available for the current block may be determined differently between when the temporal directions of the two reference pictures are the same and when the temporal directions of the two reference pictures are different. Specifically, the weighted prediction parameter of the current block may be determined differently according to whether or not both the reference picture L0 and the reference picture L1 are previous to the current picture, whether or not both the reference picture L0 and the reference picture L1 are subsequent to the current picture, or whether or not the temporal directions of the reference picture L0 and the reference picture L1 are different.

The number of available candidate weighted prediction parameters or the number of available weighted prediction parameter sets may be set differently for each block, each slice or each picture. For example, the number of available candidate weighted prediction parameters or the number of available weighted prediction parameter sets may be signaled in units of a slice. Accordingly, the number of available candidate weighted prediction parameters or the number of available weighted prediction parameter sets may be different for each slice.

The weighted prediction parameter may be derived from a neighboring block adjacent to the current block. Here, the neighboring block adjacent to the current block may include at least one of a spatial neighboring block or a temporal neighboring block of the current block.

As an example, the weighted prediction parameter of the current block may be set to a minimum value or a maximum value among weighted prediction parameters of neighboring blocks adjacent to the current block, or may be set to an average value of weighted prediction parameters of neighboring blocks.

As an example, the weighted prediction parameter of the current block may be derived from a neighboring block located at a predetermined position among neighboring blocks adjacent to the current block. Here, the predetermined position may be determined variably or fixedly. Specifically, the position of the neighboring block is determined by a size of the current block (e.g., a coding unit, a prediction unit or a transform unit), a position of the current block in the coding tree unit, a shape of the current block (e.g., a partition type of the current block), or a partition index of the current block. Alternatively, the position of the neighboring block may be predefined in the encoder/decoder and fixedly determined.

Figure 14:
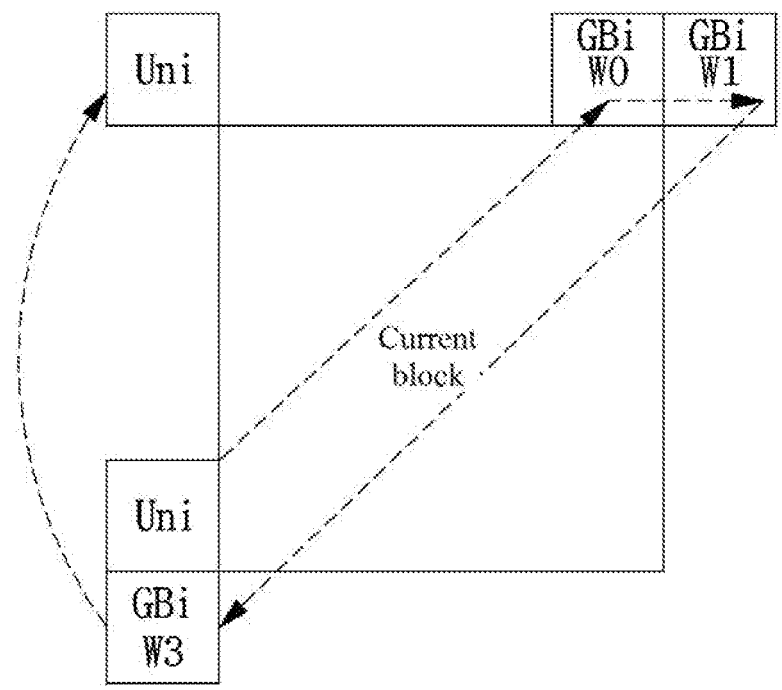
FIG. 14 is a diagram illustrating a scan order between neighboring blocks.

As an example, the weighted prediction parameter of the current block may be derived from a neighboring block to which the bi-directional weighted prediction is applied among neighboring blocks adjacent to the current block. Specifically, the weighted prediction parameter of the current block may be derived from a weighted prediction parameter of a first detected neighboring block to which the bi-directional weighted prediction is applied when the neighboring blocks adjacent to the current block is scanned in a predetermined order. FIG. 14 is a diagram illustrating a scan order between neighboring blocks. In FIG. 14, the scan is performed in order of a left neighboring block, an upper neighboring block, an upper right neighboring block, a lower left neighboring block, and a left upper neighboring block, but the present invention is not limited to the illustrated example. When the scan is performed following the predefined order, the weighted prediction parameter of the first detected neighboring block to which the bi-directional weighted prediction may be used as the weighted prediction parameter of the current block.

Alternatively, when the scan is performed following the predefined order, it is also possible to set the weighted prediction parameter of the first detected neighboring block to which the weighted bi-directional prediction is applied as the weighted prediction parameter prediction value of the current block. In this case, the weighted prediction parameter of the current block may be obtained by using the weighted prediction parameter prediction value and the weighted prediction parameter residual value.

As an example, it is also possible to derive the weighted prediction parameter of the current block from a spatial or a temporal neighboring block merged with motion information of the current block, or from a spatial or a temporal neighboring block used to derive a motion vector prediction value of the current block.

It is also possible to signal information for determining the weighted prediction parameter through a bitstream. For example, the weighted prediction parameter of the current block may be determined based on at least one of information indicating a value of the weighted prediction parameter, index information specifying one of candidate weighted prediction parameters, or set index information specifying one of weighted prediction parameter sets.

In binarizing and encoding weighted prediction parameters, the smallest binary codeword may be mapped to a weighted prediction parameter having the highest frequency of use statistically. For example, truncated unary binarization may be performed on the weighted prediction parameter as shown in Table 1 below. Table 1 is an example in case of cMax is 6.

TABLE 1

| Index | Weighted prediction parameter | Binary codeword |
|---|---|---|
| 0 | −1/4 | 111111 |
| 1 | 1/4 | 11110 |
| 2 | 3/8 | 110 |
| 3 | 1/2 | 0 |
| 4 | 5/8 | 10 |
| 5 | 3/4 | 1110 |
| 6 | 5/4 | 111110 |

The truncated unary binarization method shown in Table 1 is basically the same as a unary binarization method except that a conversion is performed after receiving the maximum value (cMax) of the input in advance. Table 2 shows the truncated unary binarization with cMax of 13.

TABLE 2

| Value | Binarization |
|---|---|
| 0 | 0 |
| 1 | 1 0 |
| 2 | 1 1 0 |
| 3 | 1 1 1 0 |
| ... | |
| 12 | 1 1 1 1 1 1 1 1 1 1 1 1 0 |
| 13 | 1 1 1 1 1 1 1 1 1 1 1 1 1 |

During the weighted prediction parameter binarization, it is also possible to use different binary codewords depending on whether or not the temporal directions of the reference pictures used for the bi-directional prediction are the same. For example, Table 3 illustrates binary codewords according to whether or not the temporal directions of the reference picture L0 and the reference picture L1 are the same.

TABLE 3

| Index | Weighted prediction parameter | Binary codeword when bi-directional prediction is performed with different directions | Binary codeword when bi-directional prediction is performed with same direction |
|---|---|---|---|
| 0 | −1/4 | 111111 | 111110 |
| 1 | 1/4 | 11110 | 1110 |
| 2 | 3/8 | 110 | 10 |
| 3 | 1/2 | 0 | 0 |
| 4 | 5/8 | 10 | 110 |
| 5 | 3/4 | 1110 | 11110 |
| 6 | 5/4 | 111110 | 111110 |

It is also possible to determine the weight prediction parameter of the current block according to a temporal order difference between the current picture and the reference picture. Here, the temporal order difference may indicate encoding/decoding order difference between pictures or output order difference between pictures (e.g., a POC difference value). For example, the weighted prediction parameter of the current picture may be determined based on at least one of the POC difference value between the current picture and the reference picture L0 (hereinafter referred to as a first reference distance) and the POC difference value between the current picture and the reference picture L1 (hereinafter referred to as a second reference distance).

Specifically, the weighted prediction parameter of the current block may be determined based on a ratio between the first reference distance and the second reference distance. When the first reference distance is w and the second reference distance is h, w/(w+h) may be used as the weighted prediction parameter of the current block. For example, when the first reference distance and the second reference distance are the same, the weighted prediction parameter of the current block may be determined as ½. In addition, when the first reference distance is 1 and the second reference distance is 3, the weighted prediction parameter of the current block may be determined as ¼.

Alternatively, when the first reference distance is w and the second reference distance is h, it is also possible to use a candidate weighted prediction parameter having a value most similar to w/(w+h) among candidate weighted prediction parameters as the weighted prediction parameter of the current block.

Alternatively, it is also possible to binarize the weighted prediction parameter of the current block in consideration of the first reference distance and the second reference distance. Table 4 shows binary codewords based on the first reference distance and the second reference distance.

TABLE 4

| Index | Weighted prediction parameter | When first reference distance is equal to second reference distance | When first reference distance and second reference distance are different (first reference distance = 2, second reference distance 1) | When first reference distance and second reference distance are different (first reference distance = 1, second reference distance 2) |
|---|---|---|---|---|
| 0 | −1/4 | 111111 | 111110 | 111111 |
| 1 | 1/4 | 11110 | 11110 | 0 |
| 2 | 3/8 | 110 | 1110 | 110 |
| 3 | 1/2 | 0 | 10 | 10 |
| 4 | 5/8 | 10 | 0 | 1110 |
| 5 | 3/4 | 1110 | 110 | 11110 |
| 6 | 5/4 | 111110 | 111110 | 111110 |

In the example shown in Table 4, when the first reference distance and the second reference distance are the same, the probability that the weighted prediction parameter will be set to ½ is high. As a result, the smallest codeword may be assigned to ½ when the first reference distance and the second reference distance are the same.

When the first reference distance and the second reference distance are different, the smallest binary codeword may be mapped to the weighted prediction parameter that is statistically the most frequently used. For example, when the first reference distance is larger than the second reference distance, the probability that a larger weight will be assigned to the reference picture L1 is high. Accordingly, the smallest binary codeword may be mapped to the weighted prediction parameter larger than ½. On the other hand, when the first reference distance is smaller than the second reference distance, the probability that a larger weight will be assigned to the reference picture L0 is high. Accordingly, the smallest binary codeword may be mapped to the weighted prediction parameter smaller than ½.

In contrast to the example shown in Table 4, it is also possible to map the smallest binary codeword to the weighted prediction parameter smaller than ½ when the first reference distance is larger than the second reference distance, and map the smallest binary codeword to the weighted prediction parameter larger than ½ when the first reference distance is smaller than the second reference distance.

Even if a current block is similar to a reference block in a reference picture, if there is a change in brightness between a current picture and a previous picture, efficiency of intra prediction or inter prediction may be decreased. Accordingly, it is possible to consider illumination compensation for compensating a prediction sample generated through the intra prediction or the inter prediction or a reconstruction sample reconstructed based on the prediction sample for the change in brightness between the current picture and the reference picture. The illumination compensation may be performed by applying an illumination compensation weight and an offset to an image that is encoded/decoded in the intra prediction or the inter prediction. For example, the illumination compensation prediction may be performed based on Equation 3 below.

$$p' = l \times p + f \quad \text{[Equation 3]}$$

In Equation 3, p may denote the predicted sample encoded/decoded by the intra prediction or the inter prediction. l denotes the illumination compensation weight, and f denotes the offset. p' may denote a weighted prediction sample to which the illumination compensation is applied.

It is also possible to apply the illumination compensation to the reconstruction sample obtained based on the prediction sample encoded/decoded in the intra prediction or the inter prediction. Specifically, the illumination compensation may be applied to the reconstruction sample before an in-loop filter is applied, or to the reconstruction sample after the in-loop filter is applied. In this case, in Equation 3, p may denote the reconstruction sample and p' may denote a weighted reconstruction sample to which the illumination compensation is applied.

An illumination change may occur across the entire area of a current picture or a current slice when comparing it with a previous picture or a previous slice. Accordingly, the illumination compensation may be performed in units of a sequence, a picture or a slice.

Alternatively, the illumination change may occur only in a partial area within a slice or a sequence when comparing it with a previous slice or a previous sequence. Accordingly, the illumination compensation may be performed in units of a predetermined area in a picture or a slice. That is, by determining whether or not to perform the illumination compensation in units of a predetermined area, it is possible to perform the illumination compensation only on a partial area, in which the illumination change is occurred, in a picture or in a slice.

When the illumination compensation is performed only for the predetermined area within a picture or a slice, information for determining an area where the illumination compensation is performed may be encoded/decoded. For example, information indicating a position of the area where the illumination compensation is performed, a size of the area where the illumination compensation is performed, or a shape of the area in which the illumination compensation is performed may be encoded/decoded.

Alternatively, it is also possible to encode/decode information indicating whether or not the illumination compensation is performed in units of a block. The information may be a flag of 1 bit, but is not limited thereto. For example, whether or not to perform the illumination compensation may be determined in units of a coding tree unit, a coding unit, a prediction unit, or a transform unit. Accordingly, the information indicating whether to perform the illumination compensation may be determined in units of a coding tree unit, a coding unit, a prediction unit, or a transform unit.

It is also possible to determine the area, in which the illumination compensation is performed, in a picture or a slice, and then determine whether to perform the illumination compensation for each of blocks included in the area. For example, when the predetermined area includes a plurality of coding tree units, a plurality of coding units, a plurality of prediction units or a plurality of transform units, information indicating whether or not to perform the illumination compensation for each block included in the predetermined area may be signaled. Accordingly, the illumination compensation may be selectively performed for each of the blocks included in units of to perform the illumination compensation.

Based on the above description, the illumination compensation prediction method according to the present invention will be described in detail.

Figure 15:
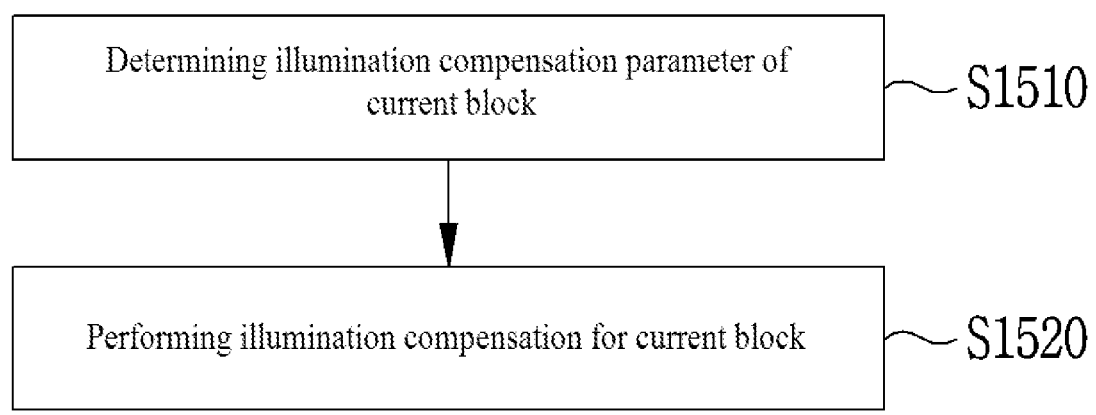
FIG. 15 is a flowchart of a method of illumination compensation prediction according to the present invention.

FIG. 15 is a flowchart of a method of illumination compensation prediction according to the present invention.

First, an illumination compensation parameter for a current block may be determined S1510. The illumination compensation parameter may include at least one of an illumination compensation weight or an offset.

The illumination compensation parameter may be signaled through a bitstream in units of a sequence, a picture, a slice, or an encoding/decoding block. Here, the unit of the encoding/decoding block may represent at least one of a coding tree unit, a coding unit, a prediction unit, or a transform unit.

Alternatively, it is also possible to signal the illumination compensation parameter for each predetermined area in which illumination compensation is performed. For example, the illumination compensation parameter may be signaled for a predetermined area including a plurality of blocks. The plurality of blocks included in the predetermined area may use the same illumination compensation parameter.

The illumination compensation parameter may be signaled regardless of an encoding mode of the current block. Alternatively, whether or not to signal the illumination compensation parameter may be determined according to the encoding mode of the current block. For example, the illumination compensation parameter may be signaled only when the encoding mode of the current block has a predefined mode. Here, the encoding mode may indicate whether the current block is encoded in intra prediction (i.e., intra prediction mode) or whether the current block is encoded in inter prediction (i.e., inter prediction mode). For example, the illumination compensation parameter may be signaled only when the current block is encoded with inter prediction. Alternatively, it is also possible that the encoding mode may indicate one of a skip mode, a merge mode, an AMVP mode, or a current picture referencing mode, which are inter prediction methods of the current block. Here, the current picture referencing mode represents an inter prediction method in which a current picture including the current block is used as a reference picture. When the current picture referencing mode is used, a prediction block of the current block may be derived from an area reconstructed previous to the current block. It is also possible to classify the current picture referencing mode as one of intra prediction modes rather than the inter prediction mode. Alternatively, the current picture referencing mode may be understood to be one embodiment of a skip mode, a merge mode, or an AMVP mode.

As an example, when the current block is encoded with the skip mode or the current picture referencing mode, the illumination compensation parameter may not be signaled. On the other hand, when the current block is encoded with the merge mode or the AMVP mode, the illumination compensation parameter may be signaled through the bitstream. If the illumination compensation parameter is not signaled, the illumination compensation for the current block may not be performed. Alternatively, if the illumination compensation parameter is not signaled, the illumination compensation of the current block may be performed using the illumination compensation parameter predefined in the encoder/decoder.

The illumination compensation parameter may be derived based on an illumination change between a first template area in the current picture and a second template area in the reference picture. The first template area may be adjacent to the current block, and the second template area may be adjacent to a reference block. Here, the reference block is used to generate the prediction block of the current block, and may be specified by a motion vector of the current block. Alternatively, the second template area may have a position co-located with the first template area in the reference picture. The position of the second template area may be variably determined in accordance with the reference picture or encoding mode of the current block.

When an unavailable sample is included in the second template area, a replacement value may be assigned to the unavailable sample using an available sample. For example, the available sample may be copied to a position of the unavailable sample, or an interpolated value calculated using a plurality of available samples may be assigned to the position of the unavailable sample. The available sample may be included in the second template region or may be located outside the second template region. For example, the replacement value of the unavailable sample included in the second template area may be calculated based on the available sample included in the reference block. At least one of a filter coefficient, a shape, or the number of filter taps of a filter used in the interpolation may be variably determined based on at least one of a size or a shape of the template region.

The illumination compensation parameter may be calculated based on a difference value between samples included in the first template region and samples included in the second template region. For example, when a neighboring sample of the current block is assumed as yi (i is 0 to N−1) and a neighboring sample of the reference block is assumed as xi (i is 0 to N−1), the illumination compensation weight l and the offset f may be derived by calculating the minimum value of E (w, f) in Equation 4.

$$E(w, f) = \Sigma_i (p_i - (lp_i - f))^2 + \lambda(w-1)^2 \quad \text{[Equation 4]}$$

Equation 4 can be modified as following Equation 5.

$$\begin{pmatrix} \Sigma_i x_i x_i + \lambda & \Sigma_i x_i \\ \Sigma_i x_i & \Sigma_i 1 \end{pmatrix} \begin{pmatrix} l \\ f \end{pmatrix} = \begin{pmatrix} \Sigma_i x_i y_i + \lambda \\ \Sigma_i y_i \end{pmatrix} \quad \text{[Equation 5]}$$

From Equation 5, Equation 6 for deriving the illumination compensation weight l and Equation 7 for deriving the offset f can be derived.

$$l = \frac{N \Sigma_i x_i y_i - \Sigma_i x_i \Sigma_i y_i + \lambda}{N \Sigma_i x_i x_i - \Sigma_i x_i \Sigma_i x_i + \lambda} \quad \text{[Equation 6]}$$

$$f = \Sigma_i y_i - a^* \Sigma_i x_i \quad \text{[Equation 7]}$$

If the illumination compensation parameter is determined, the illumination compensation for the current block may be performed using the determined illumination compensation parameter S1520. The illumination compensation may be performed by applying the illumination compensation weight and the offset to a block (e.g., a prediction block or a reconstruction block) that is encoded/decoded in the intra prediction or the inter prediction.

When the inter prediction direction of the current block indicates a plurality of directions, compensation may be performed on at least one of a plurality of prediction blocks, and a multi-directional prediction may be performed on the current block based on the prediction block to which the illumination compensation is applied. For example, if the bi-directional weighted prediction is applied to the current block, the illumination compensation may be performed on at least one of a first prediction block and a second prediction block, and then, a final predicted block or a bi-directionally predicted block of the current block may be generated based on the weighted sum operation between the first prediction block and the second prediction block.

Figure 16:
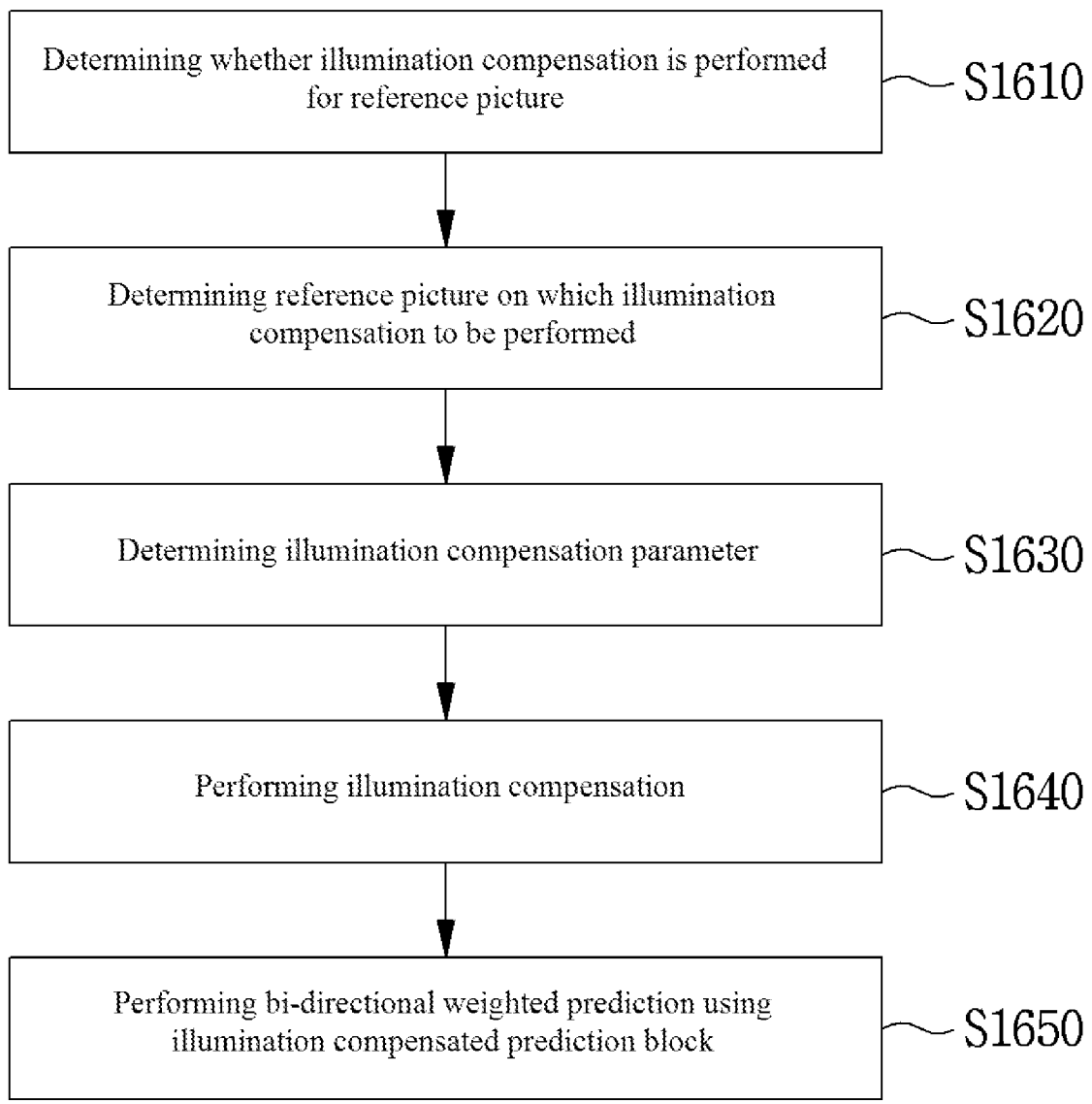
FIG. 16 is a flowchart of a bi-directional weighted prediction method based on illumination compensation.

FIG. 16 is a flowchart of a bi-directional weighted prediction method based on illumination compensation.

Referring to FIG. 16, first, it may be determined whether or not the illumination compensation is performed on a reference picture S1610. Whether or not the illumination compensation is performed on the reference picture may be determined based on information signaled through a bitstream. The information may be a 1-bit flag, but is not limited thereto. For example, pred_is_comp_flag may indicate whether or not the illumination compensation is performed on the reference picture.

If it is determined that the illumination compensation is to be performed on a reference block, the reference picture to which the illumination compensation is to be performed may be determined S1620. Specifically, when it is determined that the illumination compensation is performed on the reference block, it is possible to determine whether to perform the illumination compensation on a reference picture L0 or to perform the illumination compensation on a reference picture L1. The determination may be performed based on information signaled through the bitstream. The information may specify either one of the reference pictures. Alternatively, the information may be a plurality of 1-bit flags indicating whether or not the illumination compensation is performed on each reference picture. For example, at least one of pred_ic_comp_l0_enabled_flag indicating whether the illumination compensation is performed for the reference picture L0 or pred_ic_comp_l1_enabled_flag indicating whether the illumination compensation is performed on the reference picture L1 may be signaled through the bitstream.

If the reference picture on which the illumination compensation will be performed is determined, an illumination compensation parameter to be applied to the reference picture may be determined S1630. Since the determination of the illumination compensation parameter has been described in detail with reference to FIG. 15, a detailed description thereof will be omitted in this embodiment.

Based on the determined illumination compensation parameter, the illumination compensation may be performed on a prediction block generated based on the reference picture on which the illumination compensation is to be performed S1640. Then, the bi-directional weighted prediction for the current block may be performed using the illumination compensated prediction block S1650.

Figure 17:
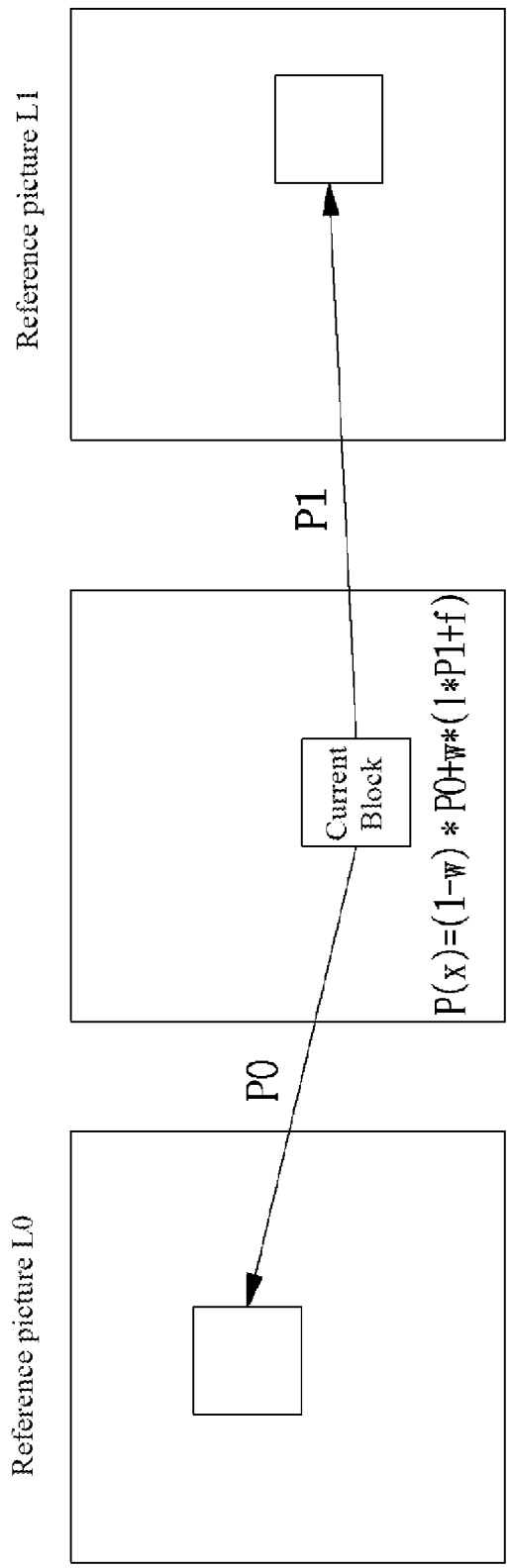
FIG. 17 is a diagram illustrating an example of performing bi-directional weighted prediction using a prediction block to which illumination compensation is applied.

FIG. 17 is a diagram illustrating an example of performing bi-directional weighted prediction using a prediction block to which illumination compensation is applied. In FIG. 17, it is illustrated that the illumination compensation has been performed on a prediction block generated based on a reference picture L1. Accordingly, the bi-directional weighted prediction for the current block may be performed based on weighted sum of a prediction block P0 generated based on a reference picture L0 and the illumination compensated prediction block (l*P1+f) generated based on the reference picture L1.

It is also possible to perform the bi-directional weighted prediction for the current block based on an illumination compensation weight used for the illumination compensation.

As an example, based on the illumination compensation weight, a weighted prediction parameter of the current block may be derived to perform the bi-directional weighted prediction on the current block. At this time, the weighted prediction parameter w of the current block may be set to the same value as the illumination compensation weight l, or may be set to (1−l). For example, when the illumination compensation based on the illumination compensation weight I is applied to the prediction block generated based on the reference picture L0, the bi-directional weighted prediction for the current block may be calculated based on the following Equation 8.

$$P(x)=l \times P_0(x)+f+(1-l)*P_1(x)$$ [Equation 8]

As an example, it is also possible to perform the bi-directional weighted prediction of the current block by applying a weight determined by the weighted prediction parameter to one of the plurality of prediction blocks and applying the illumination compensation weight to the other. For example, the bi-directional weighted prediction for the current block may be calculated based on Equation 9 below.

$$P(x)=l \times P_0(x)+f+w*P_1(x)$$ [Equation 9]

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
obtaining a first prediction block of a current block using an L0 reference picture of the current block;
obtaining a second prediction block of the current block using an L1 reference picture of the current block; and
obtaining a bi-predicted block of the current block based on a weighted sum operation of the first prediction block and the second prediction block,
wherein if a size of the current block satisfies a pre-defined condition, a first weight applied to the first prediction block and a second weight applied to the second prediction block are determined to be the same,
wherein if the size of the current block does not satisfy the pre-defined condition, the first weight and the second weight are determined based on index information specifying one among a plurality of weight candidates, and
wherein a number of the weight candidates is varied depending on temporal directions of the L0 reference picture and the L1 reference picture.

2. The method of claim 1, wherein the first weight applied to the first prediction block is derived by subtracting the second weight from a constant value, and
wherein the second weight applied to the second prediction block is determined to be a weight candidate specified by the index information.

3. The method of claim 1, wherein the number of the weight candidates is different between when both of temporal directions of the L0 reference picture and the L1 reference picture are previous to or subsequent to a current picture, and when temporal directions of the L0 reference picture and the L1 reference picture are different from each other.

4. A method for encoding a video, the method comprising:
obtaining a first prediction block of a current block using an L0 reference picture of the current block;
obtaining a second prediction block of the current block using an L1 reference picture of the current block; and
obtaining a bi-predicted block of the current block based on a weighted sum operation of the first prediction block and the second prediction block,
wherein if a size of the current block satisfies a pre-defined condition, a first weight applied to the first prediction block and a second weight applied to the second prediction block are determined to be the same,
wherein if the size of the current block does not satisfy the pre-defined condition, the first weight and the second weight are determined based on one among a plurality of weight candidates, index information specifying the determined weight candidate being encoded in a bitstream, and wherein a number of the weight candidates is varied depending on temporal directions of the L0 reference picture and the L1 reference picture.

5. A non-transitory computer-readable medium which when executed by a processor cause the processor to:

obtain a first prediction block of a current block using an L0 reference picture of the current block;

obtain a second prediction block of the current block using an L1 reference picture of the current block; and obtain a bi-predicted block of the current block based on a weighted sum operation of the first prediction block and the second prediction block, wherein if a size of the current block satisfies a pre-defined condition, a first weight applied to the first prediction block and a second weight applied to the second prediction block are determined to be the same, wherein if the size of the current block does not satisfy the pre-defined condition, the first weight and the second weight are determined based on one among a plurality of weight candidates, index information specifying the determined weight candidate being encoded in a bitstream, and wherein a number of the weight candidates is varied depending on temporal directions of the L0 reference picture and the L1 reference picture.

* * * * *